US012353170B2

(12) United States Patent
Fague et al.

(10) Patent No.: US 12,353,170 B2
(45) Date of Patent: Jul. 8, 2025

(54) DISPLAY MECHANISM

(71) Applicant: PATEK PHILIPPE SA GENEVE, Geneva (CH)

(72) Inventors: Cédric Fague, Bernex (CH); Marc-Antoine Sudan, St-Oyens (CH)

(73) Assignee: PATEK PHILIPPE SA GENEVE, Geneva (CH)

(*) Notice: Subject to any disclaimer, the term of this patent is extended or adjusted under 35 U.S.C. 154(b) by 478 days.

(21) Appl. No.: 17/637,948

(22) PCT Filed: Aug. 20, 2020

(86) PCT No.: PCT/IB2020/057825
§ 371 (c)(1),
(2) Date: Feb. 24, 2022

(87) PCT Pub. No.: WO2021/038396
PCT Pub. Date: Mar. 4, 2021

(65) Prior Publication Data

US 2022/0283546 A1 Sep. 8, 2022

(30) Foreign Application Priority Data

Aug. 30, 2019 (EP) .................................... 19194522

(51) Int. Cl.
*G04B 19/247* (2006.01)
*G04B 19/20* (2006.01)

(52) U.S. Cl.
CPC ......... *G04B 19/247* (2013.01); *G04B 19/202* (2013.01)

(58) Field of Classification Search
CPC ............................ G04B 19/247; G04B 19/202
See application file for complete search history.

(56) References Cited

U.S. PATENT DOCUMENTS

| | | | | |
|---|---|---|---|---|
| 6,735,151 | B2 * | 5/2004 | Triponez | G04B 19/20 368/37 |
| 6,738,316 | B2 | 5/2004 | Gabathuler et al. | |
| 8,724,430 | B2 * | 5/2014 | Hirano | G04B 19/253 368/80 |
| 8,801,269 | B2 * | 8/2014 | Grossenbacher | G04B 19/225 368/208 |

(Continued)

FOREIGN PATENT DOCUMENTS

| | | |
|---|---|---|
| CH | 310559 | 10/1955 |
| CH | 688 671 | 1/1998 |

(Continued)

OTHER PUBLICATIONS

International Search Report for PCT/IB2020/057825 mailed Sep. 22, 2020, 5 pages.

(Continued)

*Primary Examiner* — Edwin A. Leon
*Assistant Examiner* — Sean R Brannon
(74) *Attorney, Agent, or Firm* — NIXON & VANDERHYE

(57) ABSTRACT

Disclosed is a display mechanism for a timepiece movement including a first display wheel and a second display wheel, which are arranged to be coplanar, characterised in that the first and second display wheels are further arranged to be pivoted with respect to each other by way of at least one ball bearing.

15 Claims, 5 Drawing Sheets

(56) References Cited

U.S. PATENT DOCUMENTS

| | | | | |
|---|---|---|---|---|
| 9,529,329 | B2 * | 12/2016 | Orny | G04C 17/005 |
| 9,746,830 | B2 * | 8/2017 | Orny | G04B 19/202 |
| 9,946,226 | B2 * | 4/2018 | Orny | G04B 19/02 |
| 2002/0024887 | A1 * | 2/2002 | Triponez | G04C 17/0066<br>368/35 |

FOREIGN PATENT DOCUMENTS

| | | | |
|---|---|---|---|
| CH | 690 515 | | 9/2000 |
| CH | 703 913 | A2 | 4/2012 |
| CH | 708 001 | | 10/2014 |
| CH | 716399 | A1 | 1/2021 |
| DE | 10 2005 010 602 | | 9/2006 |
| DE | 10 2011 114 466 | | 3/2013 |
| EP | 0 258 720 | | 3/1988 |
| EP | 0 529 191 | | 3/1993 |
| EP | 1 070 996 | | 1/2001 |
| EP | 1 316 858 | A1 | 6/2003 |
| EP | 1 316 859 | | 6/2003 |
| EP | 2 674 818 | | 12/2013 |

OTHER PUBLICATIONS

Written Opinion of the ISA for PCT/IB2020/057825 mailed Sep. 22, 2020, 6 pages.

European Office Action, issued in European Patent Application No. 20760935.5 dated Jul. 4, 2024.

* cited by examiner

DISPLAY MECHANISM

CROSS-REFERENCE RELATED TO PRIOR APPLICATIONS

This application is the U.S. national phase of International Application No. PCT/IB2020/057825 filed Aug. 20, 2020 which designated the U.S. and claims priority to EP 19194522.9 filed Aug. 30, 2019, the entire contents of each of which are hereby incorporated by reference.

BACKGROUND OF THE INVENTION

Field of the Invention

The present invention relates to a display mechanism for a timepiece and in particular a simple or perpetual date-display mechanism, preferably a display mechanism permitting the date, the day of the week and the month to be displayed.

Description of the Related Art

One of the difficulties encountered in displaying the date for a timepiece, and in particular a wristwatch, is legibility. Indeed, with thirty one indications to be distributed over a display wheel (date disc), the size of the indications is often very small, even too small to be read comfortably. The problem is the same for the display of the number of the week, which comprises fifty one indications.

Several solutions to this problem have been envisaged: either optical enlargement means, such as a magnifier, are provided on the glass to aid reading, or the digits of the units and tens are divided over separate wheels and the size of these digits can thus be considerably enlarged.

The date mechanisms using this latter solution are commonly referred to as “large date” and are well known. CH 310 559 describes e.g. a date display in which the date is indicated by two juxtaposed or coplanar discs, one having the tens digits and the other the units digits. Other arrangements of the units and tens discs are possible. EP 0 529 191 and EP 1 070 996 describe a date display with a units disc and a tens disc which are superimposed. CH 690 515, DE 102005010602 and CH 688 671 describe a date display with a units disc and a tens disc which are coplanar and coaxial.

These mechanisms have a number of disadvantages. On the one hand, when they are superimposed, the difference in level between the tens and units discs impairs the reading and the appearance of the date display. On the other hand, whether they are coplanar or not, when the tens and units discs are coaxial there are constraints linked to the pivoting of their respective support: friction owing to pivoting in bearings or stones, friction owing to pivoting between the interacting spindle and/or wheels. By reason of some of these constraints, the discs may brake each other or drive each other by friction at inopportune moments. Furthermore, these mechanisms require a considerable torque to overcome these constraints and to cause the two discs to pivot at the same time when the units digit and the tens digit of the date change.

SUMMARY OF THE INVENTION

The aim of the present invention is thus to produce a display mechanism, in particular a mechanism for displaying the date, comprising two coplanar display discs, and which obviates the disadvantages mentioned above. One particular aim of the present invention is to produce a display mechanism which makes it possible to display the date, the day of the week and the month on a single line of a single aperture which is as large as possible, and without superimposition of the discs.

The present invention therefore relates to a display mechanism and to a movement and a timepiece.

BRIEF DESCRIPTION OF THE DRAWINGS

The appended figures illustrate schematically and by way of example an embodiment of a display mechanism in accordance with the invention.

DESCRIPTION OF THE PREFERRED EMBODIMENTS

Figure 1:
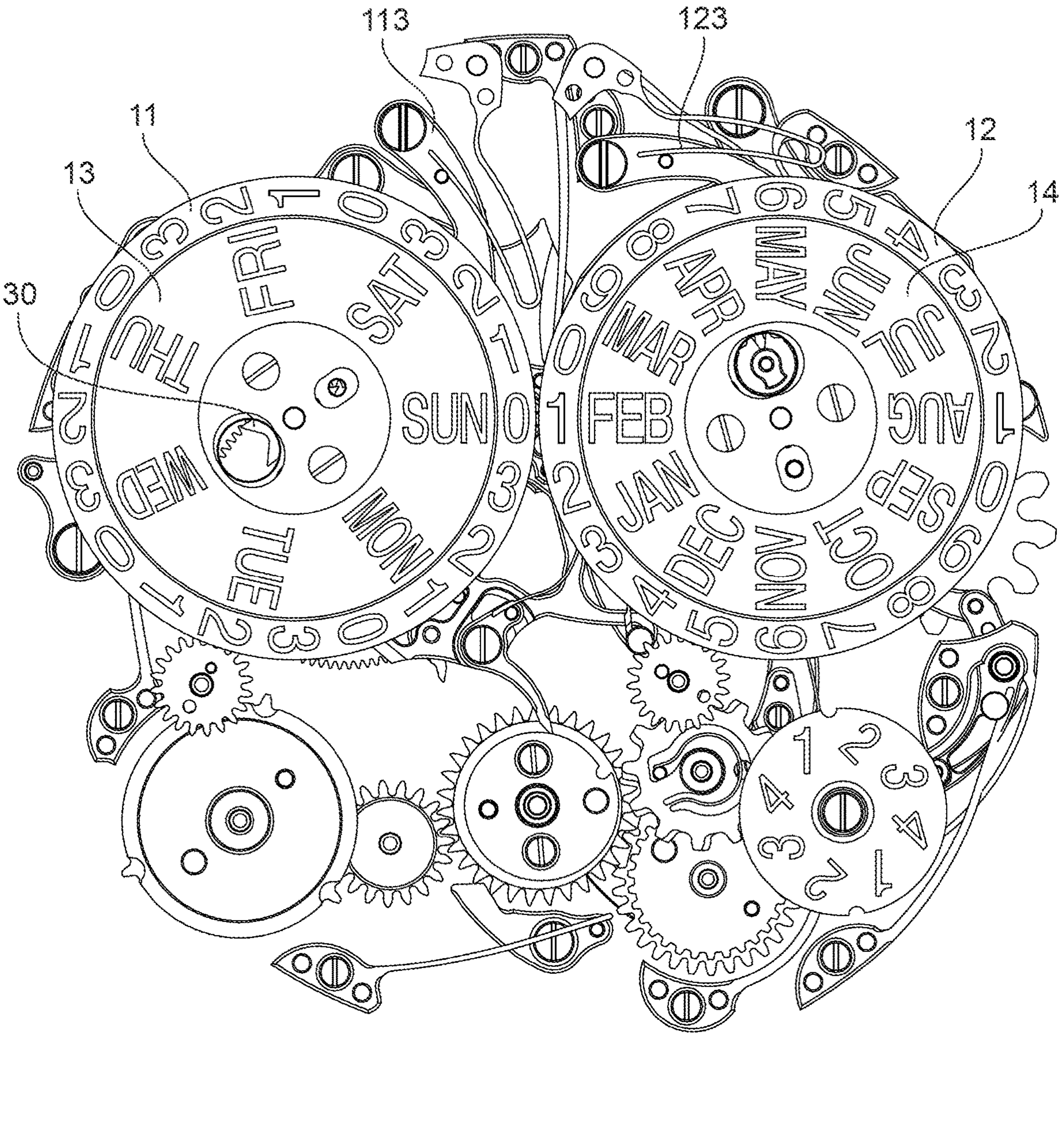
FIG. 1 shows a display mechanism according to one embodiment of the invention, permitting the date, the days of the week and the months to be displayed.
Figure 2:
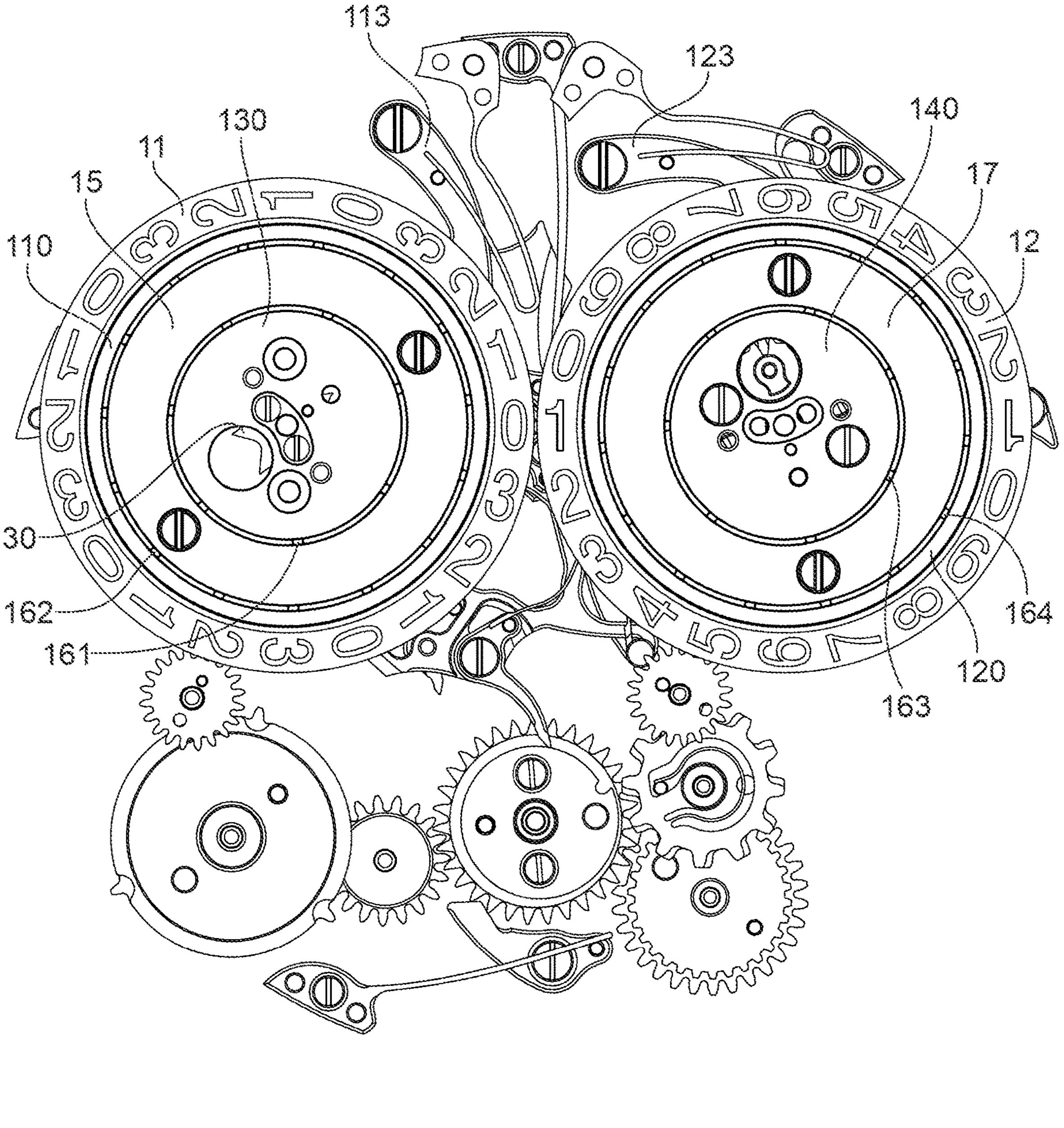
FIG. 2 is a view of FIG. 1 without the indicators for the days of the week and the months.
Figure 3:
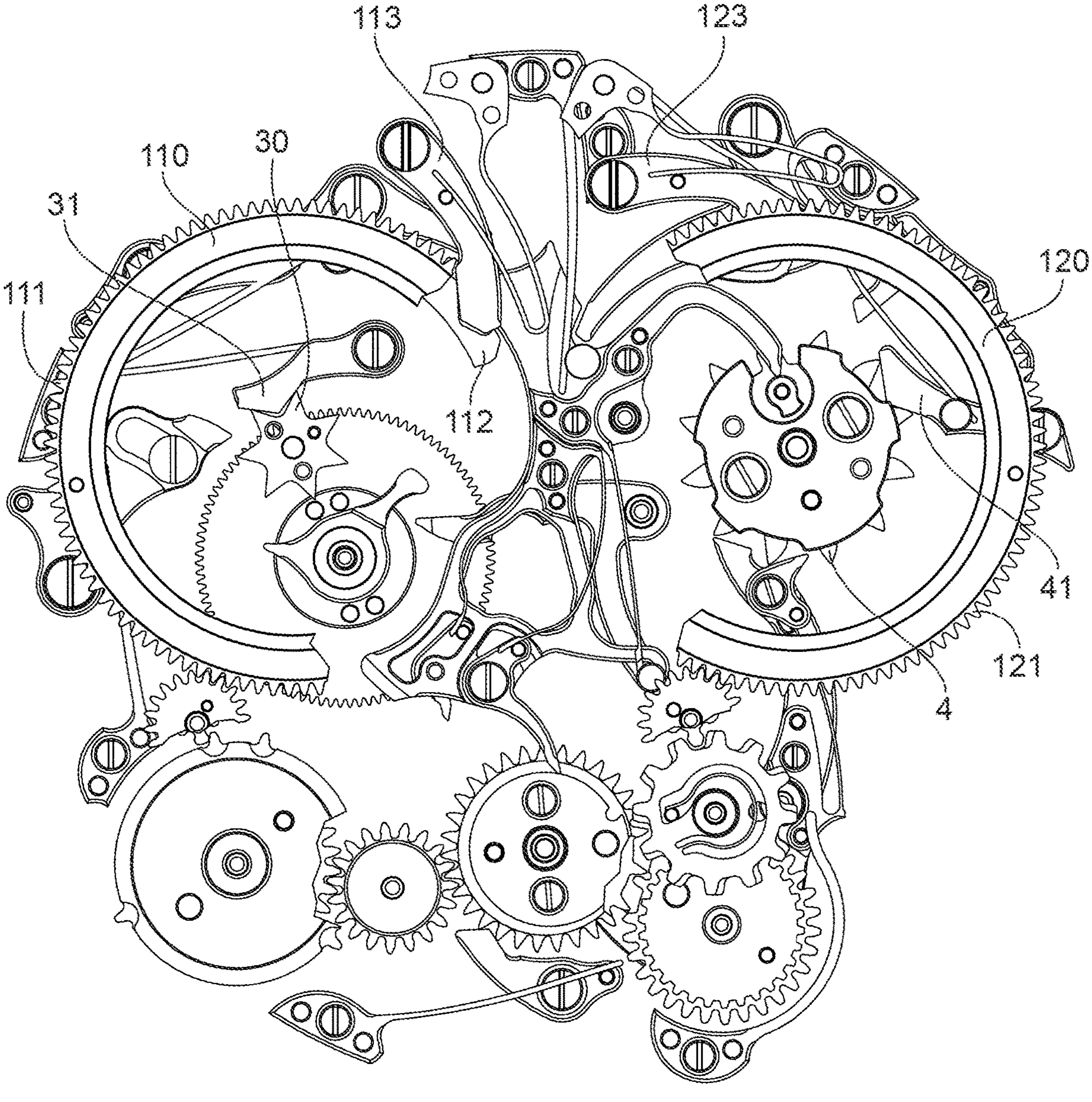
FIG. 3 is a view of FIG. 1 without any indicator or the discs for the days of the week and the months.
Figure 4A:
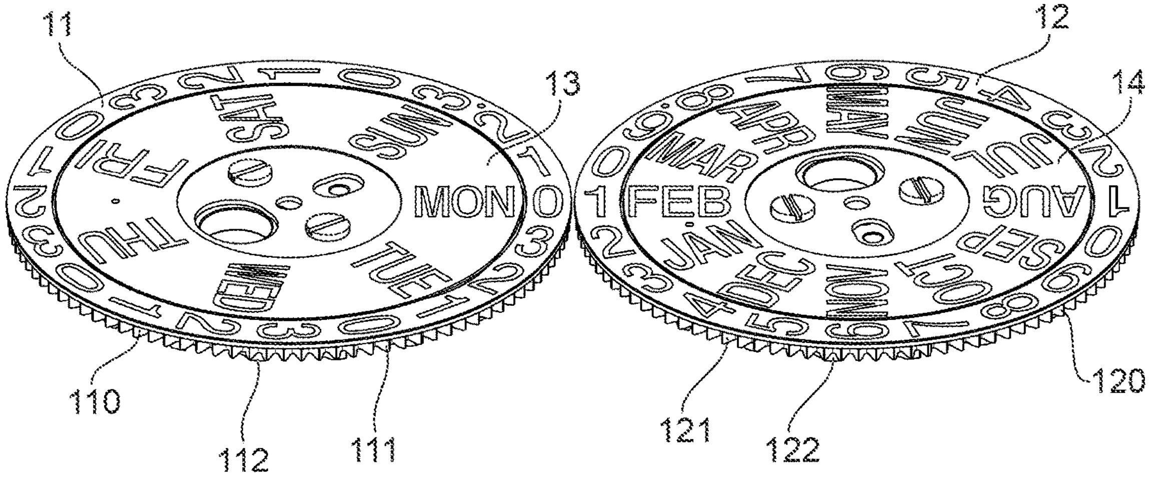
FIGS. 4*a* and 4*b* are perspective and side views of the display wheels of the display mechanism of FIG. 1.
Figure 4B:
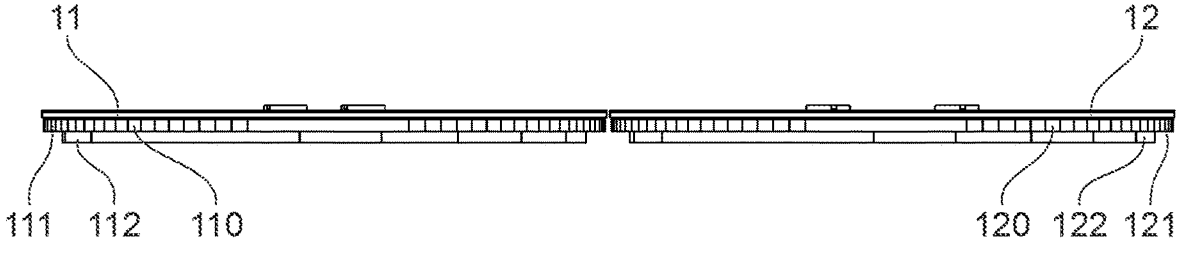

The present invention relates to a display mechanism intended to be used in a movement of a timepiece. In the illustrated embodiment, the display mechanism makes it possible to display the date, the day of the week and the month.

In particular, the illustrated display mechanism comprises a tens indicator 11 and a units indicator 12, together forming a date display, as well as a day-of-the-week indicator 13 and a month indicator 14.

The tens indicator 11 is in the shape of a crown and has the series of digits 0, 1, 2, 3 repeated five times in the anti-clockwise direction.

The units indicator 12 is also in the shape of a crown and has the series of digits 0, 1, 2, 3, 4, 5, 6, 7, 8, 9 repeated twice in the anti-clockwise direction.

Since the units and tens are indicated by separate wheels, the display of the date is of the “large date” type and thus makes it possible to use indications of a reasonable size to facilitate reading.

The day-of-the-week indicator 13 and the month indicator 14 are in the shape of a disc and have respectively seven indications for the days of the week and twelve indications for the months of the year, distributed in the clockwise direction (the usual English abbreviations are used as indications in the figures).

In the illustrated embodiment, the tens indicator 11 and the days-of-the-week indicator 13 are coaxial and coplanar, the tens indicator 11 surrounding the days-of-the-week indicator 13. The units indicator 12 and the month indicator 14 are also coaxial and coplanar, the units indicator 12 surrounding the month indicator 14. The four indicators 11, 12, 13, 14 are arranged to be coplanar. It is thus possible to display the day, the date and the month on a line and in a single large aperture.

Figure 5A:
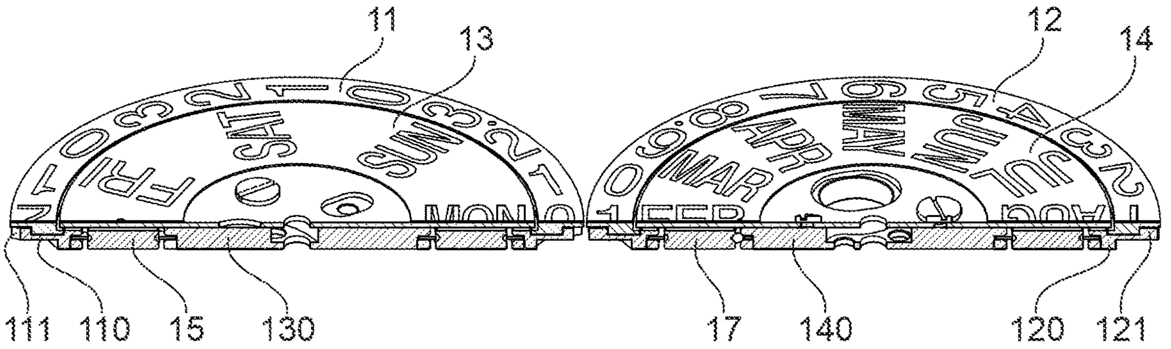
FIGS. 5*a* and 5*b* are perspective and cross-sectional views of the ball bearings of the display mechanism of FIG. 1.
Figure 5B:
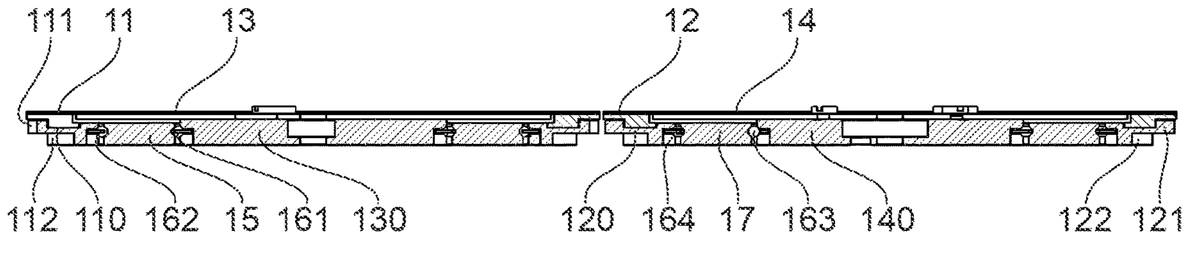

More precisely, the day-of-the-week indicator 13 is borne by a day-of-the-week disc 130. The day-of-the-week disc 130 is arranged to pivot with respect to a first fixed ring 15 coaxial to said day-of-the-week disc 130 and fixedly mounted on the plate or a bridge of the movement. The day-of-the-week disc 130 pivots inside the first fixed ring 15 by means of a first ball bearing (see FIGS. 5*a* and 5*b*) in which a first series of balls 161 are held in a regularly spaced arrangement by any suitable means (cage) between the day-of-the-week disc 130 and the first fixed ring 15.

The tens indicator 11 is borne by a tens ring 110 mounted coaxial to the day-of-the-week disc 130 and to the first fixed ring 15 and arranged to pivot with respect to said first fixed ring 15 by means of a second ball bearing (see FIGS. 5*a* and 5*b*) in which a second series of balls 162 are held in a regularly spaced arrangement by any suitable means (cage) between the tens ring 110 and the first fixed ring 15.

The arrangement of the units indicator 12 and month indicator 14 is similar. The month indicator 14 is borne by a month disc 140. The month disc 140 is arranged to pivot with respect to a second fixed ring 17 coaxial to said month disc 140 and fixedly mounted on the plate or a bridge of the movement. The month disc 140 pivots inside the second fixed ring 17 by means of a third ball bearing (see FIGS. 5*a* and 5*b*) in which a third series of balls 163 are held in a regularly spaced arrangement by any suitable means (cage) between the month disc 140 and the second fixed ring 17.

The units indicator 12 is borne by a units ring 120 mounted coaxial to the month disc 140 and to the second fixed ring 17 and arranged to pivot with respect to said second fixed ring 17 by means of a fourth ball bearing (see FIGS. 5*a* and 5*b*) in which a fourth series of balls 164 are held in a regularly spaced arrangement by any suitable means (cage) between the units ring 120 and the second fixed ring 17.

Thus the four ball bearings, formed firstly by the day-of-the-week disc 130, the first fixed ring 15 and the first series of balls 161, secondly by the first fixed ring 15, the tens ring 110 and the second series of balls 162, thirdly by the month disc 140, the second fixed ring 17 and the third series of balls 163, and fourthly by the second fixed ring 17, the units ring 120 and the fourth series of balls 164, permit replacement of the sliding friction (of a spindle between two bearings or stones, or tubes interacting one inside the other) by rolling friction between the day of-the-week disc 130, the tens ring 110 and the first fixed ring 15 and between the month disc 140, the units ring 120 and the second fixed ring 17. The rings 110, 120 are respectively coplanar with the discs 130, 140 and the ball bearings.

Generally speaking, the display mechanism according to the first embodiment is arranged to drive the units ring 120 (units indicator 12) thirty times per month (no driving during the transition from 31 to 01, see below) and the day-of-the-week disc 130 (day-of-the-week indicator 13) once per day, the tens ring 110 and the tens indicator 11 four times per month and the month disc 140 (month indicator 14) once per month.

In order to do this, the tens ring 110 has an outer tooth arrangement 111 for it to be driven four steps per month via a dedicated kinematic chain of the display mechanism, and a positioning tooth arrangement 112 cooperating with a jumper 113 for its angular positioning.

The units ring 120 also has an outer tooth arrangement 121 for it to be driven thirty steps per month via a dedicated kinematic chain of the display mechanism and a positioning tooth arrangement 122 cooperating with a jumper 123 for its angular positioning.

The day-of-the-week disc 130, for its part, is fixedly attached to a day-of-the-week star 30 comprising seven teeth arranged to be driven by one step per day by a dedicated kinematic chain of the display mechanism, and the positioning of which is performed by a jumper 31.

Finally, the month disc 140 is also fixedly attached to a month star 4 having twelve teeth and arranged to perform one rotation per year. The positioning of the month star 4 and thus of the month disc 140 is effected by a month jumper 41.

The display mechanism according to the present embodiment preferably automatically takes account of the length of the months (28, 29, 30 or 31) days, the transition from 31 to 01 at the end of the month, and leap years. This is therefore a perpetual date display mechanism. Since the operation of such a perpetual calendar and of the kinematic chains of which it is composed are not the subject of the present invention they will not be described in more detail hereinunder.

The display mechanism described above can also comprise a correction mechanism to permit correction of the displayed date, day of the week and month.

The display mechanism described above permitting the display of the date, days of the week and months and, moreover, doing so in a perpetual manner, is an example of an embodiment of a display mechanism in accordance with the invention.

As a variant, the display mechanism in accordance with the invention could be a simple, annual or secular calendar or a display of the number of the week or even a chronograph counter or more generally a display mechanism permitting the display of a single item of information in a single aperture or of a plurality of distinct items of information in at least one aperture.

The embodiment presented above is in fact the combination of several variants of the invention: indeed, the units indicator and the tens indicator are coplanar and juxtaposed and pivoted with respect to each other by means of two ball bearings and cooperate together to display a single item of information (the date) in the same aperture; while the tens indicator and the day-of-the-week indicator are coplanar and coaxial and pivot with respect to each other by means of two ball bearings also to display two distinct items of information (tens digit of the date and day of the week) in the same aperture.

The display mechanism in accordance with the invention generally comprises at least one first display wheel and a second display wheel arranged to be coplanar, either being coaxial or being juxtaposed. The first and second display wheels are also arranged to be pivoted with respect to each other by means of at least one ball bearing.

In a first variant, each of the first and second display wheels comprises at least a fixed part and a movable part which is arranged to pivot with respect to the fixed part by means of a first or a second ball bearing respectively. This means that a first or a second series of balls respectively are placed between the movable part of the first display wheel and its fixed part and between the movable part of the second display wheel and its fixed part to form a first and a second ball bearing respectively. In this variant, several arrangements are possible for one, the other or both display wheels: movable part pivoted inside or outside their respective fixed part, movable part pivoted between a first and a second fixed part by means of two ball bearings. Depending on the arrangement, the movable parts and the fixed parts can be in the form of a disc or of a ring.

In another variant, the first and second display wheels are also coaxial and each have a movable part. According to a first alternative, the movable part of the second display wheel pivots inside the movable part of the first display wheel by means of a ball bearing, balls being placed between the movable part of the first display wheel and the movable part of the second display wheel. According to this first alternative, the first display wheel can further comprise a fixed part, and the movable part of said first display wheel can be arranged to pivot with respect to said fixed part by means of another ball bearing. According to a second alternative, the display mechanism further comprises at least one fixed part coaxial and coplanar to the first and second display wheels, the movable part of the first display wheel pivoting with respect to the fixed part, on the outside thereof, by means of a first ball bearing, while the movable part of the second display wheel pivots with respect to the fixed part, on the inside thereof, by means of a second ball bearing. In this second alternative, a plurality of arrangements are possible for one, the other or both display wheels: the mechanism could comprise a second, central, fixed part, around which the movable part of the second display wheel would be pivoted by means of another ball bearing; the mechanism could comprise a third, outer, fixed part, inside of which the movable part of the first display wheel would be pivoted by means of yet another ball bearing. As in the previous variant, depending on the selected arrangement, the movable parts and the fixed parts can be in the form of a disc or of a ring.

The first and second display wheels each bear indicators intended to cooperate with at least one fixed aperture to display one or more items of information. The indicators preferably cooperate with the same fixed single aperture.

It is thus possible to produce a display mechanism with coplanar, coaxial or juxtaposed wheels, thus offering a display which is legible and attractive (no difference in level) while overcoming the constraints linked to the pivoting of wheels which are found in the prior art. Indeed, using ball bearings to pivot two coplanar wheels means it is no longer necessary to cause said wheels to pivot between stones or bearings, nor to cause tubes or wheels to pivot one inside the other if the wheels are coaxial. Thus the constraints due to sliding friction are removed. The wheels are truly independent of each other, there being no risk of interaction (a wheel which drives another owing to excessive friction constraints). Finally, since the rolling friction is less than the sliding friction, the energy required for the rotation of the wheels is also greatly reduced, which is of great value in the case of a display mechanism such as that described above in which, at the end of the month, a considerable number of wheels must be driven.

The invention claimed is:

1. A display mechanism for a timepiece movement, the display mechanism comprising:
- at least one ball bearing;
- a first display wheel bearing a first indicator; and
- a second display wheel coplanar with the first display wheel, the second display wheel bearing a second indicator,
- wherein the first and second display wheels are configured to be pivoted with respect to each other by the at least one ball bearing,
- the first and second display wheels and the at least one ball bearing are coplanar,
- one of the first and second display wheels is nested with respect to the other of the first and second display wheels,
- the at least one ball bearing is disposed between the first display wheel and the second display wheel, and
- the first and second indicators cooperate with at least one fixed aperture of the display mechanism to display at least one item of information.

2. The display mechanism as claimed in claim 1, wherein the at least one ball bearing comprises a first ball bearing and a second ball bearing,
- wherein each of the first and second display wheels comprises a fixed part and a movable part configured so that the movable part is configured to be pivoted with respect to the fixed part by the first ball bearing and the second ball bearing respectively.

3. A timepiece movement comprising:
- the display mechanism as claimed in claim 2.

4. The display mechanism as claimed in claim 1, wherein the first and second display wheels are coaxial.

5. The display mechanism as claimed in claim 4, wherein the at least one ball bearing includes a first ball bearing,
- wherein each of the first and second display wheels comprises a movable part, the movable part of the second display wheel being configured to be pivoted inside the movable part of the first display wheel by the first ball bearing.

6. The display mechanism as claimed in claim 5, wherein the at least one ball bearing includes a second ball bearing and a third ball bearing,
- wherein the display mechanism further comprises at least one fixed part configured so that either the movable part of the first display wheel is pivoted inside said fixed part by the second ball bearing or the movable part of the second display wheel is pivoted outside of said fixed part by the third ball bearing.

7. A timepiece movement comprising:
- the display mechanism as claimed in claim 5.

8. A timepiece movement comprising:
- the display mechanism as claimed in claim 4.

9. The display mechanism as claimed in claim 1, wherein the at least one fixed aperture is a single fixed aperture, and
- wherein the first and second indicators are configured so that both cooperate with the single fixed aperture.

10. The display mechanism as claimed in claim 9, wherein the first and second indicators cooperate with the single fixed aperture to display a single item of information.

11. A timepiece movement comprising:
- the display mechanism as claimed in claim 1.

12. A timepiece comprising:
- the timepiece movement as claimed in claim 11.

13. A display mechanism for a timepiece movement, comprising:
- a first display wheel;
- a second display wheel arranged to be coplanar and coaxial with the first display wheel, the first and second display wheels being further arranged to be pivoted with respect to each other; and
- a fixed ring coaxial and coplanar to the first and second display wheels;
- wherein the first display wheel comprises an outer ring and the second display wheel comprises an inner ring or disc; and
- wherein the outer ring of the first display wheel is arranged to pivot with respect to the fixed ring, on an outside of the fixed ring, by means of a first ball bearing, and the inner ring or disc of the second display wheel is arranged to pivot with respect to the fixed ring, on an inside of the fixed ring, by means of a second ball bearing.

14. The display mechanism as claimed in claim 13, wherein the first and second display wheels bear a first and a second indicator, respectively, the first and second display wheels being configured so that the first and second indicators cooperate with at least one fixed aperture for the display of at least one item of information.

15. The display mechanism as claimed in claim 14, wherein the first and second indicators borne by the first and second display wheels both cooperate with a single said at least one fixed aperture to display a single item of information.

* * * * *